US009705138B2

(12) United States Patent
Cooney et al.

(10) Patent No.: US 9,705,138 B2
(45) Date of Patent: Jul. 11, 2017

(54) METHODS OF FORMING ARRAYS OF FUEL CELLS ON A COMPOSITE SURFACE

(71) Applicant: Intelligent Energy Limited, Loughborough (GB)

(72) Inventors: Erin Cooney, Armstrong (CA); Paul Sobejko, Monroe, CT (US); Jeremy Schrooten, Mission (CA)

(73) Assignee: Intelligent Energy Limited, Loughborough (GB)

( * ) Notice: Subject to any disclaimer, the term of this patent is extended or adjusted under 35 U.S.C. 154(b) by 522 days.

(21) Appl. No.: 14/346,208

(22) PCT Filed: Sep. 21, 2012

(86) PCT No.: PCT/US2012/056648
§ 371 (c)(1),
(2) Date: Mar. 20, 2014

(87) PCT Pub. No.: WO2013/044083
PCT Pub. Date: Mar. 28, 2013

(65) Prior Publication Data
US 2014/0225313 A1    Aug. 14, 2014

Related U.S. Application Data

(60) Provisional application No. 61/538,526, filed on Sep. 23, 2011.

(51) Int. Cl.
*H01M 8/02* (2016.01)
*H01M 8/00* (2016.01)
(Continued)

(52) U.S. Cl.
CPC ......... *H01M 8/006* (2013.01); *H01M 8/0202* (2013.01); *H01M 8/1004* (2013.01);
(Continued)

(58) Field of Classification Search
CPC ... H01M 8/006; H01M 8/1076; H01M 4/8875
See application file for complete search history.

(56) References Cited

U.S. PATENT DOCUMENTS 2,243,787 A * 5/1941 Batcheller ............... C23C 22/24
148/264
3,160,835 A * 12/1964 Christensen ........ H01L 27/0688
257/522

(Continued)

FOREIGN PATENT DOCUMENTS

CA    WO 2009105896 A1 *  9/2009  ............. H01B 1/122
JP          2003123792 A       4/2003
(Continued)

OTHER PUBLICATIONS

International Application No. PCT/US2012/056648, International Search Report and Written Opinion mailed Nov. 30, 2012, 12 pgs.
(Continued)

*Primary Examiner* — Matthew Daniels
(74) *Attorney, Agent, or Firm* — Baker & Hostetler LLP

(57) ABSTRACT

Methods of manufacturing a fuel cell array that include selectively removing portions of a coating layer from a composite layer. The composite layer includes a first surface and a second surface and a first coating is disposed over at least a portion of the first surface. A laser or mechanical tool is used to selectively remove portions of the first coating to form discontinuity regions at predetermined positions in the first coating.

19 Claims, 6 Drawing Sheets

(51) Int. Cl.
    *H01M 8/1004*     (2016.01)
    *H01M 8/0202*     (2016.01)
    *H01M 8/241*     (2016.01)
    *H01M 8/1018*     (2016.01)

(52) U.S. Cl.
    CPC .... *H01M 8/241* (2013.01); *H01M 2008/1095* (2013.01); *Y02P 70/56* (2015.11)

(56) References Cited

U.S. PATENT DOCUMENTS

| | | |
|---|---|---|
| 7,491,431 B2 | 2/2009 | Chiruvolu et al. |
| 7,632,587 B2 | 12/2009 | Mclean et al. |
| 2005/0208354 A1 | 9/2005 | Hahn et al. |
| 2007/0190392 A1* | 8/2007 | Kim ................ H01M 8/021 429/457 |
| 2009/0081512 A1 | 3/2009 | Blanchard et al. |
| 2009/0162722 A1 | 6/2009 | Schrooten et al. |
| 2011/0195336 A1 | 8/2011 | Kabumoto et al. |
| 2012/0038595 A1* | 2/2012 | Park ................ G06F 3/044 345/176 |

FOREIGN PATENT DOCUMENTS

| | | |
|---|---|---|
| JP | 2010-257943 A | 11/2010 |
| JP | 2011-165633 A | 8/2011 |
| WO | WO-2013044083 A1 | 3/2013 |

OTHER PUBLICATIONS

"Laser Structuring of MEA films for Micro Fuel Cells", LPKF Press Release, (Nov. 2007), 2 pgs.

Schmitz, A., et al., "MEA Segmentation using LASER Ablation", Fuel Cells, 4(3), (Aug. 2004), 190-195.

\* cited by examiner

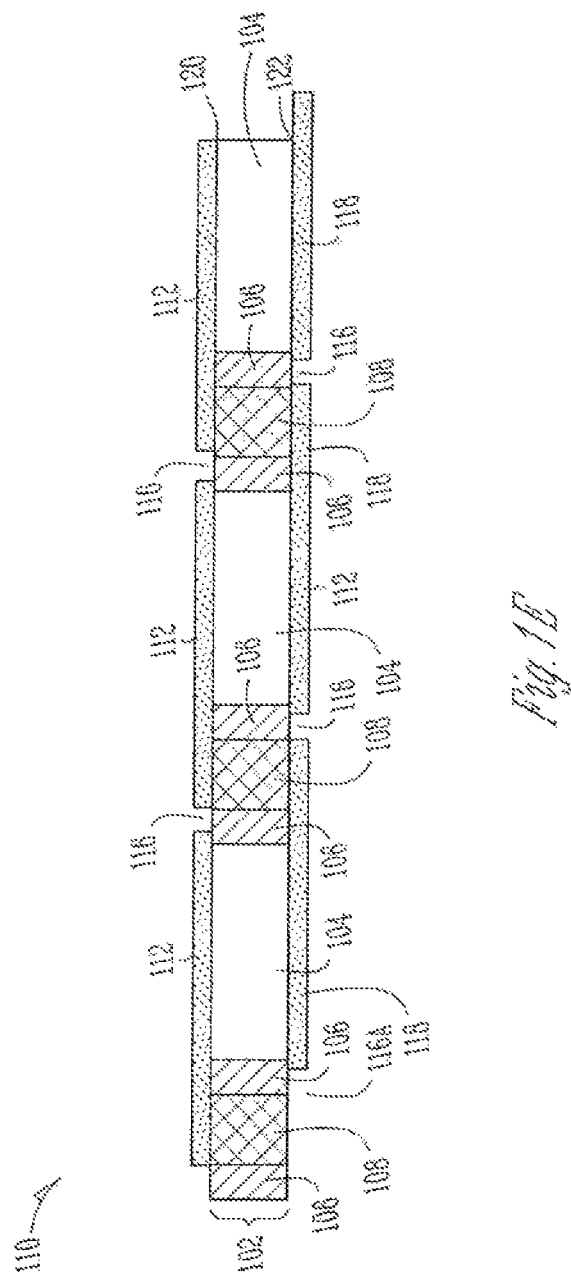

METHODS OF FORMING ARRAYS OF FUEL CELLS ON A COMPOSITE SURFACE

PRIORITY OF INVENTION

This application claims the benefit of priority to U.S. Provisional Patent Application Ser. No. 61/538,526, filed Sep. 23, 2011, which is herein incorporated by reference in its entirety.

FIELD OF THE INVENTION

The subject matter of the present invention relates to methods for the manufacture of planar fuel cell arrays.

BACKGROUND

Electrochemical cells, such as fuel cells, include pathways for the transport of charged chemical species. Ions from electrochemical reactions are transported through an ion-exchange membrane (e.g., a proton exchange membrane) and electrons are transferred between adjacent fuel cells. In some types of cells, a path for proton conductivity is integrated within the fuel cell while a path for electron conductivity is created between adjacent fuel cells to provide an electrical circuit from the positive and negative electrical connections of the fuel cell device.

A class of fuel cell architecture is emerging for use in micro fuel cell applications that includes a thin layered fuel cell structure with neighboring fuel cells arranged adjacent to each other in an array. The fuel cell array can include multiple fuel cells which have like electrodes arranged next to each other on the same face of the fuel cell layer. There exists a need for improved manufacturing methods for producing such fuel cell architecture.

SUMMARY

Various embodiments of the present invention provide methods of manufacturing a fuel cell array. The methods comprise providing a composite layer and a first coating, wherein the composite layer includes a first surface and a second surface and the first coating is disposed over at least a portion of the first surface, and selectively removing portions of the first coating to form discontinuity regions at predetermined positions in the first coating. In some embodiments, the portions of the first coating are selectively removed with emitted energy (e.g., a laser), a stream of matter (e.g., water, a solid, or both), or a mechanical tool. In some embodiments, a mask is aligned with the first coating or composite layer in order to assist in the selective removal.

The composite layer used in the inventive methods may include any of the composite layers described herein or any of the composite layers that are described in the patent documents incorporated herein by reference and can include some form of coating on one or both of its major surfaces (e.g., a coating that is an electrochemical reaction layer, such as, for example, an electrode layer or a catalyst layer). For example, a composite layer used in the inventive methods may include one or more coating layers one or more sides of the composite layer. Any of the coating layers may include a catalyst material, an electrode material, both a catalyst material and an electrode material, or some other materials in addition to or instead of a catalyst and/or electrode material.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1E illustrates a cross-sectional view of a coated composite that includes a second coating.

DETAILED DESCRIPTION

Figure 1A:
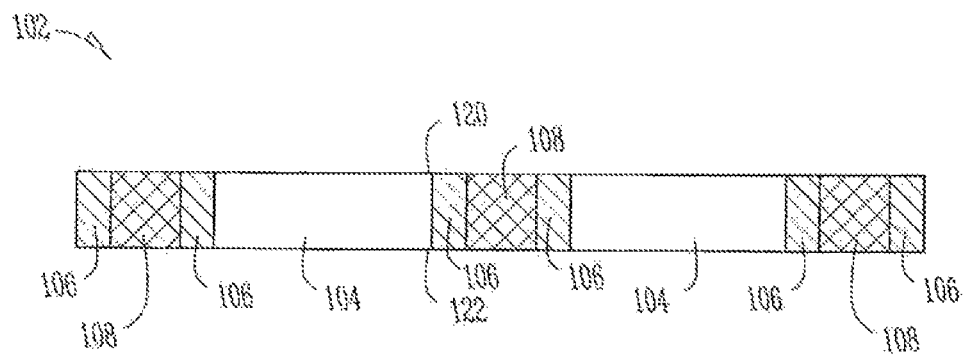
FIGS. 1A-1D illustrate a sequential depiction of one embodiment of the inventive method.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100.

Planar arrays of fuel cells can comprise a thin layered fuel cell structure with neighboring fuel cells arranged adjacent each other. Previous disclosures, such as commonly-assigned US Patent Pub. No. 2009/0162722, filed 22 Dec. 2008 and entitled ELECTROCHEMICAL CELL ASSEMBLIES INCLUDING A REGION OF DISCONTINUITY, and International PCT Application Pub. No. WO2009/105896, filed 27 Feb. 2009 and entitled ELECTROCHEMICAL CELL AND MEMBRANES RELATED THERETO, (the entire contents of both of which are incorporated by reference herein) have shown the need for the creation of regions of discontinuity in fuel cell arrays, to prevent the electrical short circuit of adjacent electrodes.

A precisely defined region of discontinuity between conductive regions of adjacent fuel cells in the array provides a discontinuity in conductivity. It is generally desirable to minimize the width of discontinuity regions in order to segment a planar array of electrodes into multiple electrode regions while minimizing the amount of space that does not contribute to energy conversion, thereby maximizing the power density of the fuel cell layer.

Regions of discontinuity in electrodes of planar fuel cell layers are typically achieved by direct deposition methods that dispose electrode material on a substrate at desired locations or by masked deposition methods which prevent the deposition of electrode material at desired locations. Examples of direct deposition methods include transfer printing of patterned electrodes, stencil printing of electrodes, and inkjet printing of electrodes. Masked deposition involves spray deposition using contact masks or shadow masks.

It is difficult to obtain sufficiently narrow regions of discontinuity in the electrode area of a fuel cell array using these prior art direct deposition and masking methods. In general, direct deposition methods deposit materials with a region of decreasing thickness rather than uniformly, with a precise 90 degree "edge." In other words, it is difficult to form borders having a sharp "edge" with direct deposition methods because such methods tend to produce deposited regions having a border with a tapered edge. For this reason, the regions of discontinuity between neighboring directly deposited electrodes must be quite wide, to allow sufficient space for the transition area from the thickest part of the electrode to the discontinuity region.

Masked deposition methods also have disadvantages due to the limitations of making the mask. The width of the discontinuity regions must generally be made to be wider than is desirable to ensure the mask is durable, and will not fall out of alignment with the underlying substrate. Furthermore, when spraying material over a mask it is possible for electrode material to divert underneath the mask, thus creating a potential short circuit. To prevent this, the mask width must be widened so that the regions of unwanted deposition under either edge of the mask do not make electrical contact. Once again, this requires the mask dimensions, and the width of the resulting discontinuity, to be wider than is desired for obtaining high active area utilization.

Another disadvantage of prior art methods of electrode array formation is that the methods limit the species of materials that can be used for forming the electrode structures. As fuel cell technology has progressed, it has become preferable to build electrodes comprising multiple layers of different materials (not all of which can be processed as deposition inks) and to build electrodes from composite inks that may contain relatively large particles or fibers that require a wider spacing of deposited electrodes in order to ensure that the particles and fibers do not form short circuits. In some cases, it is desirable to employ materials which cannot be deposited as liquids or pastes (e.g., electrically conducting woven or non-woven materials or porous dielectric layers which can be useful for water management). Such materials may have to be cut to a desired size and then placed directly on the fuel cell layer (e.g., via a lamination process), with regions of discontinuities formed by the space between adjacent placed parts. In such cases, the parts may be difficult to align with the substrate and relatively large regions of discontinuity must be formed to allow for the misalignment and to prevent the creation of an electrical short circuit.

Further, some deposition methods are not conducive to masking processes. For example, while it is known to use masks in some sputtering or vapor deposition methods, such methods are generally reserved for low-volume production processes. Mask-based puttering or vapor deposition methods are not practical for high-volume manufacturing lines that generally utilizes roll-to-roll based processes.

Yet another disadvantage of masked deposition methods of electrode array formation is the difficulty in aligning a mask with multiple discontinuity regions when three dimensional composite substrates are used. Some composite layers, although superficially "flat" or "planar", are in fact three dimensional, as is described in commonly-assigned International PCT App. Pub. WO2011/079377, filed 23 Dec. 2010 and entitled FUEL CELLS AND FUEL CELL COMPONENTS HAVING ASYMMETRIC ARCHITECTURE AND METHODS THEREOF, the disclosure of which is incorporated herein in its entirety by reference. Such composite substrates may also be flexible or conformable, either in whole or in part, as is described in commonly-assigned U.S. Patent App. Pub. No. 2009/0081493, filed on 25 Sep. 2008 and entitled FUEL CELL SYSTEMS INCLUDING SPACE-SAVING FLUID PLENUM AND RELATED METHODS, U.S. Patent App. Pub. No. 2006/0127734, filed on 9 Jan. 2006 and entitled FLEXIBLE FUEL CELL STRUCTURES HAVING EXTERNAL SUPPORT, and U.S. Pat. No. 7,747,075 entitled DEVICES POWERED BY CONFORMABLE FUEL CELLS, the disclosures of which are all incorporated herein in their entirety by reference.

When using contact and shadow masks with low precision spray deposition of liquid inks, more than one electrode region will be covered at one time so any mask used must simultaneously align with multiple desired regions of discontinuity. Simultaneous alignment of multiple masks is particularly challenging since the dimensions of the underlying composite layers are prone to change according to variations in environmental conditions. To account for the dimensional variability of the underlying composite layers, the width of the discontinuity regions must be increased.

The present invention provides alternative methods of forming arrays of electrode regions separated by regions of discontinuity. The methods use subtractive techniques to selectively remove electrode materials from particular regions of a planar or non-planar fuel cell structure. The use of subtractive techniques allows the creation of narrower, more precise regions of discontinuity which can be better aligned with features of the underlying composite substrate. The method provides discontinuity regions that can be narrower than those achieved with direct deposition and masked deposition methods and can allow a wider variety of materials and deposition methods to be used to form electrodes. The methods can also be used to form discontinuity regions that are non-linear across all or a portion of one or more surfaces of a fuel cell structure.

Definitions

As used herein, "catalyst" refers to a material or substance that assists in starting or increasing the rate of a reaction, without being modified or consumed itself. Catalyst layers may comprise any type of electrocatalyst suitable for the application at hand Catalysts or catalyst layers may include pure platinum, carbon-supported platinum, platinum black, platinum-ruthenium, palladium, copper, tin oxide, silicon oxide, nickel, gold, graphite, mixtures of carbon black and one or more binders. Binders may include ionomers, polypropylene, polyethylene, polycarbonate, polyimides, polyamides, fluoropolymers and other polymer materials, and may be films, powders, or dispersions. An example of a polyimide includes Kapton®. An example of a fluoropolymer is PTFE (polytetrafluoroethylene) or Teflon®. Other fluoropolymers include PFSA (perfluorosulfonic acid), PEP (fluorinated ethylene propylene), PEEK (poly ethylene ether ketones) and PFA (perfluoroalkoxyethylene). The binder may also include PVDF (polyvinylidene difluoride) powder (e.g., Kynar®) and silicon dioxide powder. The binder may include any combination of polymers or ionomers. The carbon black may include any suitable finely divided carbon material such as one or more of acetylene black carbon, carbon particles, carbon flakes, carbon fibers, carbon needles, carbon nanotubes, and carbon nanoparticles.

As used herein, "coating" refers to a conductive or non-conductive thin-layer disposed or deposited over a surface of a composite layer. A coating can be disposed or deposited over and adjacent to the surface of the composite layer, or it can be disposed or deposited over the composite layer surface but separated from direct contact by intermediate layers of materials (e.g., additional layers of the same or different coating material). For example, the coating may be an electrochemical reaction layer, such as a catalyst layer or an electrode layer (e.g., anodes and cathodes).

As used herein, a "composite layer" or "composite" refers to a layer including at least two surfaces having a thickness, where one or more ion conducting passages and one or more electrically conductive passages are defined between the surfaces. Ion conducting properties and electrically conductive properties of a composite layer can be varied in different regions of the composite by defining ion conducting passages and electrically conductive passages with varying sizes, shapes, densities or arrangements. A composite layer may be impermeable, or substantially impermeable, to a fluid (e.g. a gas or a liquid). A composite layer may include dielectric materials. A composite layer is capable of providing desired electrical conductivity, ionic conductivity, gas permeability, gas impermeability, and mechanical strength characteristics over the entire spatial extent of the composite layer or of varying degrees over different regions of the composite layer. Composite layers may be used as substrates. Suitable composite layers to which the inventive methods can be applied includes the composite layers described herein and any composite layer that is described in any of the patent documents incorporated herein by reference and includes or could include a coating layer disposed over or adjacent to one or both of the major surfaces of the composite layer. For clarity, the Figures herein illustrate various embodiments of composite layers that include arrangements of only a relatively small number of composite layer components; however, the methods of the present invention can be applied to composite layers with a much larger number of composite layer components.

In addition to the other commonly-assigned patent documents cited and incorporated herein, the following U.S. patents and applications provide multiple examples of composite layer architecture, including arrays of electrochemical cells such as fuel cell layers, that can be utilized as a composite layer subject to the instant inventive methods:

i) U.S. Pat. No. 7,632,587, issued on 15 Dec. 2009 and entitled ELECTROCHEMICAL CELLS HAVING CURRENT-CARRYING STRUCTURES UNDERLYING ELECTROCHEMICAL REACTION LAYERS;

ii) U.S. Pat. App. Pub. No. 2009/0081493, filed on 25 Sep. 2008 and entitled FUEL CELL SYSTEMS INCLUDING SPACE-SAVING FLUID PLENUM AND RELATED METHODS;

iii) U.S. Pat. App. Pub. No. 2009/0162722, filed on 22 Dec. 2008 and entitled ELECTROCHEMICAL CELL ASSEMBLIES INCLUDING A REGION OF DISCONTINUITY;

iv) U.S. Pat. App. Pub. No. 2011/0003229, filed on 27 Feb. 2009 as PCT App. No. PCT/CA09/00253 and entitled ELECTROCHEMICAL CELL AND MEMBRANES RELATED THERETO;

v) U.S. Pat. App. Pub. No. 2011/0165495, filed on 28 Dec. 2010 and entitled APPARATUS AND METHOD FOR CONNECTING FUEL CELLS TO AN EXTERNAL CIRCUIT; and vi) U.S. application Ser. No. 13/172,645, filed on 29 Jun. 2011 and entitle APPARATUS AND METHODS FOR CONNECTING FUEL CELLS TO AN EXTERNAL CIRCUIT.

All of these patent documents are incorporated herein by reference in their entirety.

As used herein, the terms and phrases "current collector," "interconnect," or "fuel cell connection component" may be used interchangeably and refer to an electrically conducting member that electrically communicates electrodes of two or more fuel cell units. The fuel cell connection component or cell interconnect is adapted for use in the fuel cell such that it provides an electrically conductive path between the at least one electrode or the fuel cell and an external circuit or between the at least one electrode of the fuel cell and at least one electrode of a different fuel cell. The interconnect may include any one of the electrically conducting passageways of the composite layer and/or a terminal current collector for communicating the array with an external circuit. In some embodiments of the invention, the interconnect may include electrically non-conductive "interface region" or "dielectric components" in addition to the electrically conductive components. In some embodiments, the interconnect may be formed by laminating dielectric components together with electrically conductive components to form a composite current collecting element. The dielectric components may provide dimensional stability, promote adhesion between the ion-conducting components and the current collectors, and may be used as described herein for the formation of regions of electrical discontinuity between adjacent cells. Further examples of such composite current collectors, or cell interconnects, may be found in commonly owned U.S. Patent Applications U.S. Patent App. Pub. No. 2011/0165495 and its continuation-in-part application U.S. Ser. No. 13/172, 645, both titled "Apparatus and Methods for connecting Fuel Cells to an external circuit", the disclosures of which are herein incorporated by reference in their entirety.

As used herein, a "dielectric component" refers to a component of a composite layer that includes one or more dielectric materials. The dielectric component of the composite layer can include ion-conducting passageways, a dielectric protective layer, a dielectric skin, a dielectric support structure or some combination thereof. The dielectric component may include a proton exchange membrane component, a thin-film oxide electrolyte, or a fiber filled epoxy resin for example.

As used herein, a "dielectric material" refers to a substance exhibiting negligible electrical conductivity. Dielectric materials may be understood to include ion-conducting materials, non-ion-conducting materials, or combinations thereof. Examples of ion-conducting materials include any ionomer or electrolyte suitable to a given application, such as ion-exchange polymers, alkaline solutions, acidic solutions, phosphoric acid, alkali carbonates, and oxide ion-conducting ceramics. Examples of non-ion-conducting materials include polymers, such as polypropylene, polyethylene, polycarbonate, poly ethylene ether ketones, polyimides, polyamides, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene) and PFA (perfluoroalkoxyethylene). Dielectric materials may also include reinforced composite materials such as fiberglass, any suitable non polymer materials such as silicon or glass, and combinations thereof. The dielectric material may include an electrolyte. The electrolyte may be a solid electrolyte membrane.

As used herein, a "discontinuity region" refers to an area on the surface of a composite layer that provides physical separation between coating regions. Where the coating regions are conductive, a discontinuity region may also provide electrical separation between them. A discontinuity region may also be referred to as a "region of discontinuity" or "insular break."

As used herein, "electrochemical reaction layer" refers to regions in which electrochemical reactions take place. An electrochemical reaction layer may include materials or components that act as anodes, cathodes or both in an electrochemical reaction. The electrochemical reaction layer can include an electrode material, a catalyst material, electrically conductive materials, gas permeable materials and water active materials (i.e. hydrophilic and hydrophobic materials), and may include structural additives to provide mechanical durability. The composition of electrochemical reaction layers may be optimized to promote reactions.

As used herein, "electrode regions" or "electrodes" refer to materials or components that act as anodes, cathodes or both in an electrochemical reaction. Electrode regions may include catalysts. Electrode regions may include pure platinum, platinum black, carbon-supported platinum, palladium, copper, nickel, gold, woven and non-woven carbon fiber paper, carbon paper, mixtures of carbon black, carbon powder, graphite powder, expanded graphite, conductive adhesive such as graphite filled epoxy, conductive primer such as graphite filled Nafion™, Nafion™, or combinations thereof. Electrode regions may also include a microporous layer. A microporous layer is a component whose function is to promote thermal, water, and electrical transport in the electrode as well as to provide structural support in the electrode. The microporous layer may include graphite powder, carbon powder, carbon needles, carbon nanotubes, graphite flakes, graphite needles, tin oxide, silicon oxide, and a binder. A binder may include ionomers, polypropylene, polyethylene, polycarbonate, polyimides, polyamides, fluoropolymers, and other polymer materials, and may be films, powders, or dispersions. An example of a polyimide includes Kapton™. An example of a fluoropolymer is PTFE (polytetrafluoroethylene) or Teflon™. Other fluoropolymers include PFSA (perfluoroalkoxyethylene). The binder may also include PVDF (polyvinylidene difluoride) powder (e.g., Kynar™) and silicon dioxide powder. The binder may include any combination of polymers or ionomers. Examples of such a microporous layer include those commercially available, in the form of a coated carbon paper and coated carbon fiber paper, as well as those manufactured by Société Bic of Clichy, France. Electrode regions may include performance enhancing layers as described in commonly-assigned PCT Application Publication No. WO 2011/079378 filed 23 Dec. 2010, entitled "PERFORMANCE ENHANCING LAYERS FOR FUEL CELLS," the disclosure of which is incorporated herein in its entirety by reference. Electrode regions may be disposed on the surface of a composite layer, in the form of a coating. "Electrode regions" and "electrodes" will herein be used interchangeably.

As described herein, an "electron conducting component" refers to a component of a composite layer that provides an electrically conductive pathway. The electron conducting component may provide an electrically conductive pathway, or pathways, from one surface of a composite layer, through the composite, to the opposite surface of the composite layer, for example. Electron conducting components include one or more materials that are electrically conductive, for example, metals, metal foams, carbonaceous materials, electrically conductive ceramics, electrically conductive polymers, combinations thereof, and the like.

As used herein, an "ion conducting component" refers to a component of a composite layer that provides an ion conductive pathway. Ion conducting components include an ion conducting material, such as a fluoropolymer-based ion conducting material or a hydrocarbon-based ion conducting material. Ion conducting components may also be referred to herein as "electrolytes" or "electrolyte membranes".

As used herein, "plane" refers to a two-dimensional hypothetical surface having a determinate extension and spatial direction or position. For example, a rectangular block may have a vertical plane and two horizontal planes, orthogonal to one another. Planes may be defined relative to one another using angles greater or less than 90 degrees, for example.

As used herein, a "fuel cell array" refers to a plurality of individual unit cells. The plurality of cells may be formed on a sheet of ion exchange membrane material or other substrate or may be formed by assembling a number of components in a particular manner. Arrays can be formed to any suitable geometry. Examples of planar arrays of fuel cells are described in commonly-owned U.S. Patent App. Pub. No. 2005/0250004 filed on 2 Feb. 2005 and entitled ELECTROCHEMICAL CELLS HAVING CURRENT CARRYING STRUCTURES UNDERLYING ELECTROCHEMICAL REACTION LAYERS, the disclosure of which is herein incorporated by reference in its entirety, as well as other commonly-owned applications incorporated by reference herein. Fuel cells in an array can also follow other planar surfaces, such as tubes (as found in cylindrical fuel cells). Alternately or in addition, the array can include flexible materials that can be conformed to a wide variety of geometries.

A fuel cell layer that includes a plurality of unit cells may be constructed by providing a substrate that includes a plurality of ion conducting regions. Such a substrate could be provided, for example, by selectively treating a sheet of non- or partially-conducting material to form ion conducting regions or by selectively treating a sheet of ion conducting material to form non-conducting regions, as described, for example in the commonly-assigned application US Patent App. Pub. No. 2005/0249994, filed 4 May 2004 and entitled MEMBRANES AND ELECTROCHEMICAL CELLS INCORPORATING SUCH MEMBRANES, the disclosure of which is herein incorporated by reference in its entirety.

A fuel cell layer may include a plurality of unit cells manufactured by patterning conductive and dielectric strip members, as described, for example, in the commonly-assigned application U.S. Patent App. Pub. No. 2009/0095409, filed 30 Sep. 2008 and entitled METHODS OF MANUFACTURING ELECTROCHEMICAL CELLS, the disclosure of which is herein incorporated by reference in its entirety.

FIGS. 1A-1D illustrate a sequential depiction of one embodiment of the inventive method showing a cross-sectional view of a composite layer being coated and then portions of the coating being selectively removed to form discontinuity regions.

FIG. 1A illustrates composite layer 102 which includes first side 120 and second side 122. Layer 102 includes a plurality of ion-conducting components 104, dielectric components 106, and electron conducting components 108. Each of the components 104, 106, and 108 extend from first side 120 to second side 122. While FIG. 1 illustrates a composite layer where ion-conducting, dielectric, and electron conducting components all extend from a first to a second side, in some of the embodiments of the invention one or more component or types of components may not extend from a first to a second side. For example, a composite layer may include ion-conducting and electron conducting components that extend from a first to a second side and one or more dielectric components that do not extend from a first to a second side but instead extend only partially through the composite layer.

Figure 1B:
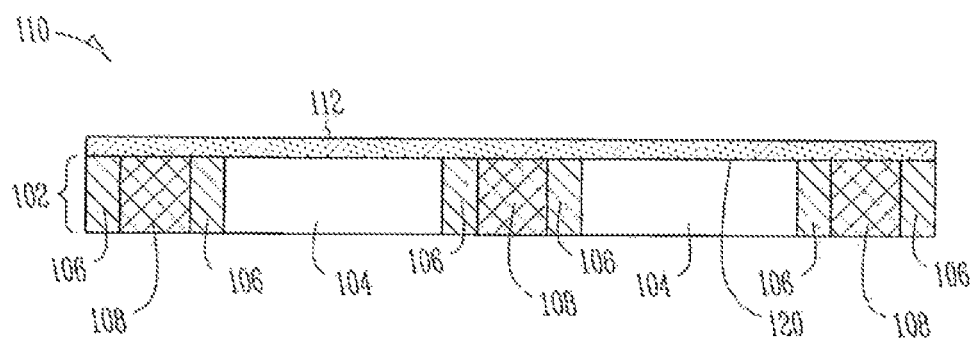

FIG. 1B illustrates composite layer 102 after first coating 112 has been disposed over and adjacent to first side 120 to form coated composite layer 110. First coating 112 overlies the portions of components 104, 106, and 108 that form first side 120. First coating 112 is a layer of electrode material which, as illustrated in FIG. 1B, forms one continuous electrode region over first side 120. In some embodiments, the coating can be a layer of catalytic or electrode material.

Figure 1C:
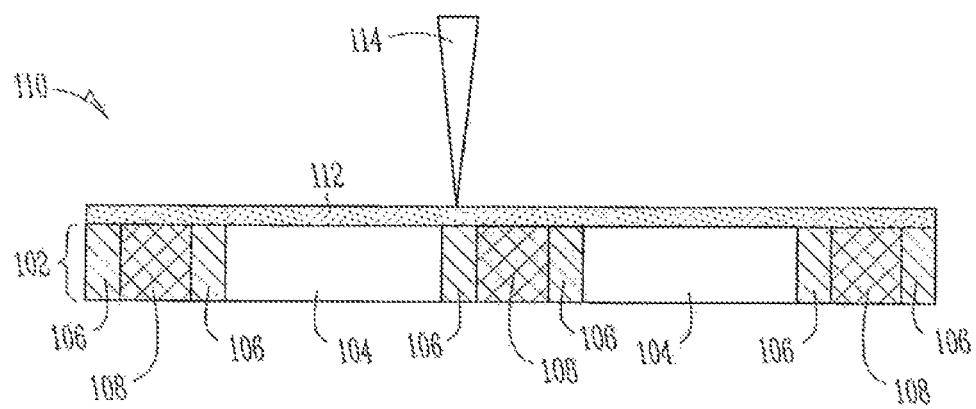

FIG. 1C illustrates the selective removal of portions of first coating 112. Laser 114 is used to cut or burn away portions of first coating 112 from predetermined locations, thereby removing electrode material from those selected locations of first coating 112. In some embodiments of the invention, the laser light has a wavelength of between about 200 and about 400 nanometers or between about 250 and about 355 nanometers, though any wavelength of laser light may be used if it is effective at removing a given coating material.

Figure 1D:
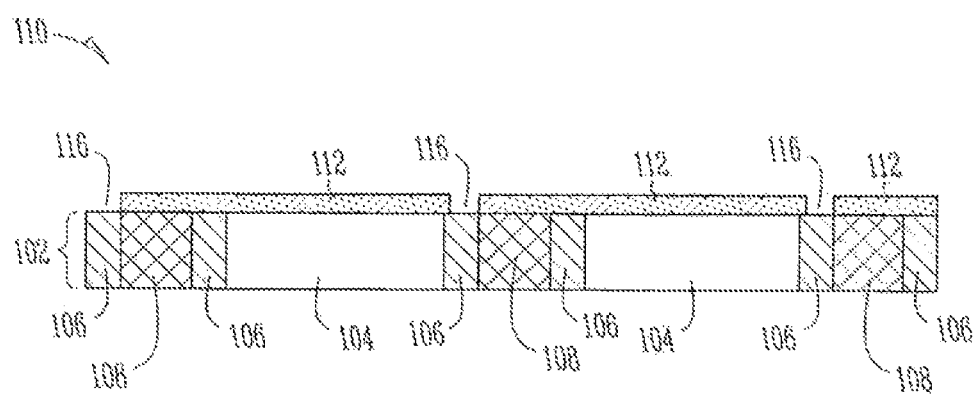

FIG. 1D illustrates coated composite layer 110 after the selective removal of portions of first coating 112. As shown, three portions of composite layer 110 have been removed by laser 114, forming three discontinuity regions 116 that overlie regions of first side 120 formed by three dielectric components 106 and exposing the three underlying dielectric components 106. Composite layer 102 supports the three neighboring regions of first coating 112, with the three discontinuity regions 116 separating and electrically insulating the three neighboring regions of first coating 112 from one another. While FIGS. 1A-1D illustrate the creation of three discontinuity regions, one, two, four, or more than four discontinuity regions can be formed in a coating layer if desired. Also, while FIGS. 1C and 1D illustrate the creation of discontinuity regions in a portion of a coating layer overlying dielectric components of a composite layer, the present invention is not so limited. For example, some embodiments of the present invention includes methods and articles where a discontinuity region is created in an area of a coating layer that overlies other portions of a composite layer (e.g., ion-conducting and/or electron-conducting components).

In some embodiments of the invention, a composite layer is coated on both the first and second sides and the coatings on both sides are subjected to selective removal of material. FIG. 1E illustrates such an embodiment as another cross-sectional view of coated composite 110, with composite 110 including second coating 118. Similar to the depiction in FIGS. 1B and 1C of the layering of first coating 112 followed by the selective removal of material from first coating 112, second coating 118 has been disposed over and adjacent to second side 122 and then subjected to selective removal of portions of material from 118 by a laser. The selective removal of material from coating 118 has produced discontinuity regions 116 and discontinuity region 116A, which separate and electrically insulate three regions of second coating 118 from one another. Discontinuity regions 116 each overlie and expose regions of second side 122 formed by one of dielectric components 106, while discontinuity region 116A overlies and exposes a region of second side 122 formed by two dielectric components 106 and one electron conducting component 108. Two of the three regions of second coating 118 are illustrated as overlying one of electron conducting components 108, hence each of those two regions of second coating 118 are in electrical communication with the region of first coating 112 opposite and adjacent to the respective underlying electron conducting component 108. Discontinuity region 116A can be useful for such purposes as allowing a current to collected from coated composite layer 110 by a current collector so that it can be directed out to an external device.

While FIGS. 1A-1D illustrate the selective removal of a coating material with the use of a laser, other embodiments of the invention use forms of energy other than laser light or use streams of matter to selectively remove coating material. For example, an ablative stream of liquid (e.g., a jet of water), small solid particles (e.g., sandblasting), or a slurry of both liquid and solid particles may be used to selectively remove coating material.

Figure 2:
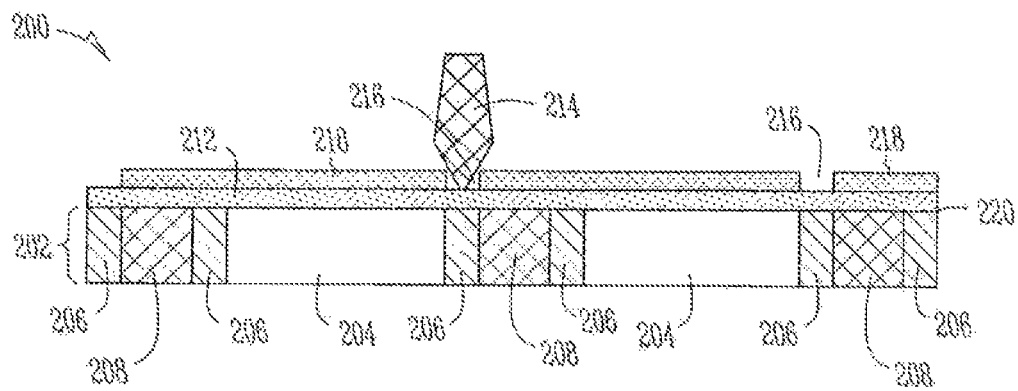
FIG. 2 illustrates a coated composite layer and a mask.

In some embodiments, the invention includes a method of selective removal that utilizes a mechanical tool to remove material from a coating on a composite layer. FIG. 2 illustrates such an embodiment that includes coated composite layer 200. Coated composite layer 200 is similar to coated composite layer 110 illustrated in FIG. 1C, with coated composite layer 200 including composite layer 202 and first coating 212 disposed over and adjacent to first side 220 of composite layer 202. Composite layer 202 includes ion conducting components 204, dielectric components 206, and electron conducting components 208. In some embodiments, first coating 212 is a layer of electrode material or a layer of catalyst material.

In some embodiments, the invention includes methods and means for identifying locations on a substrate (e.g., a coated composite layer) where it is desirable to form a discontinuity region and aligning the tool or tools used to selectively remove the material to form said discontinuities. If the substrate is geometrically stable, a point of alignment on the substrate can be used to position the substrate and material-removing tool or tools relative to one another. However, the substrate may not be geometrically stable. For example, local variations in temperature and humidity may cause the substrate or portions of a substrate (e.g., proton-conducting membrane materials) to swell or shrink. The methods used to form the discontinuities may also contribute to substrate geometric instability. For example, the tool or tools used to remove material may produce heat that contributes to localized swelling of the substrate or portions of the substrate.

In some embodiments, the invention includes realigning the tool or tools relative to the substrate before forming each discontinuity region or groups of discontinuity regions. For example, one or more fiduciary marks can be formed or identified on the substrate relative to the desired locations of individual discontinuities or groups of discontinuities and those marks used to align the substrate relative to the tool or tools used for removing material. If one fiduciary mark is to be used as a reference point to form a group of discontinuities, a tolerance study can be performed to help ensure that geometric distortions of the substrate across the group will be sufficiently small that a single fiduciary mark can be adequate for tool alignment. Fiduciary marks can be a mechanical feature or an optically detectible feature. Fiduciary marks may also be a feature naturally present in the substrate, such as detectable boundaries between parts of the substrate (e.g., the boundaries between current collectors or electrolyte regions).

In some embodiments, the invention includes the use of a computer vision system to perform optical alignment of individual or group discontinuities by detecting the fiduciary mark or marks and then computing a tool offset from the mark(s) to locate the position of the desired discontinuity or discontinuities.

Continuing with FIG. 2, mask 218 is disposed over first coating 212. Mask 218 includes openings 216 which are placed over regions of first coating 212 from which material is to be removed. Mechanical tool 214 is guided by openings 216 of mask 218 and is used to remove material from first coating 212 to create the desired discontinuity regions. Mechanical tool 214 may remove material by cutting, scribing, scoring, shaving, scraping, shearing, or cleaving processes. The material for a given discontinuity region may be removed by the tool in one material-removing step or may be removed in multiple steps with some portion of the total material being removed in each step.

In some embodiments of the invention, it may be desirable to use more than one mechanical tool to remove material. In those embodiments, two or more different or similar mechanical tools may be used simultaneously or sequentially to form one or more of the discontinuity regions. For example, forming a given discontinuity may require removal of material in two or more stages using two different tools or two tools that are similar, such as using a dado blade to form two parallel cuts in proximity to each other followed by removing material left between the two cuts. In another example, a mask may identify multiple desired locations for discontinuity regions and two or more similar or different tools are used in parallel to remove material from the locations. In these embodiments, the mask is used to protect regions of the coating layer from being ablated or removed, rather than to define regions where the coating layer will not be deposited. In some embodiments, two or more different or similar mechanical tools are used to remove material without the use of a mask.

Mask 218 can be properly aligned on coated composite layer 200 by guiding it relative to features on coated composite layer 200. For example, structural features (e.g., differences in height, slope, or orientation), contrasts between regions or other boundaries between regions, or compositional features (e.g., regions of dielectric materials) of coated composite layer 200 may be used as guides to ensure mask 218 is properly aligned on coated composite layer 200. Mask 218 may be aligned manually or by computer-control using optical, ultrasonic, or other methods of detecting differences in color, reflectivity, transmissivity, density, topography, or the like.

The above-mentioned methods of aligning a mask can also be used to align the material-removal implement used to remove material. For example, a CNC-guided mechanical tool, as described further below, maybe be aligned with the coating or composite layer with the use of the computer-controlled methods mentioned above. In another example, an implement used to remove coating material with energy or matter (e.g., an implement that emits a laser or a stream of liquid and/or solids) may be aligned with the coating or composite layer with the use of the computer-controlled methods mentioned above.

While FIG. 2 illustrates the use of a mask and mechanical tool to selectively remove a coating material, in some embodiments the invention utilizes one or more mechanical tools without the use of a mask. For example, one or more mechanical tools attached to computer numerical control machine(s) (a CNC machine) could be used for maskless material removal, with the CNC machine(s) providing the tool(s) with sufficient precise control to form discontinuity regions without the need for a mask. Also, while FIG. 2 illustrates the use of a mask and mechanical tool to selectively remove a coating material, in some embodiments the invention utilizes a mask in conjunction with the above-mentioned energy-emitting ablative instruments (e.g., a laser) or ablative instruments that project a stream of liquid and/or solid matter. For example, in some embodiments, the invention includes aligning a mask with a coating or composite layer and then using a laser to selectively remove coating material.

Figure 3:
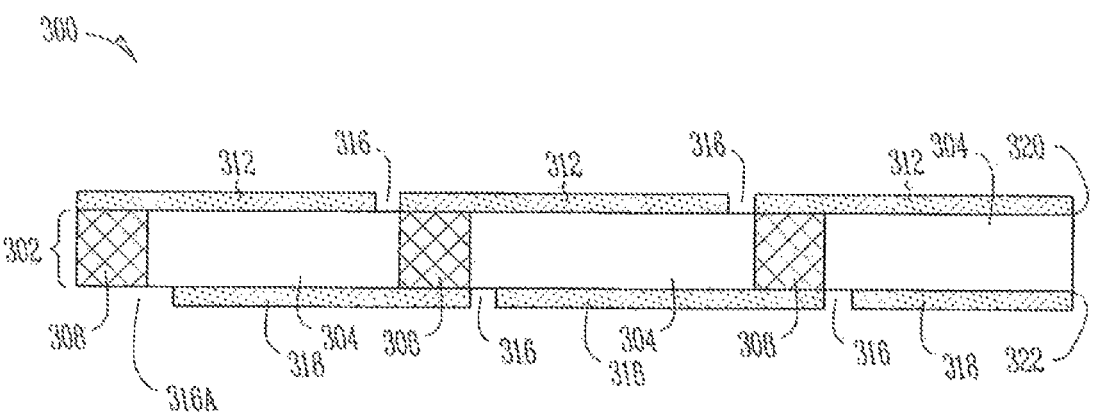
FIG. 3 illustrates a composite layer that does not include dielectric components.

In some embodiments of the invention, the composite layer includes ion-conducting components but no other dielectric components. FIG. 3 illustrates such an embodiment as coated composite layer 300. Coated composite layer 300 includes composite layer 302 over which is disposed first coating 312 on first side 320 and second coating 318 on second side 322. Composite layer includes ion conducting components 304 and electron conducting components 308, with components 304 and 308 located in alternating positions along the length of layer 302. Material has been selectively removed from first coating 312 to form three separate and distinct regions of first coating 312 material on first side 320. Material has been similarly removed from second coating 318 to form three separate and distinct regions of second coating 318 material on second side 322.

In some embodiments of the invention, the discontinuity regions are formed on two sides of a coated composite layer such that the discontinuity regions are aligned across the composite layer from one another. In other embodiments, such as those shown in the previous figures, the discontinuity regions are staggered or unaligned from one another across the composite layer. In still other embodiments, some of the discontinuity regions are aligned while others are unaligned.

Figure 4:
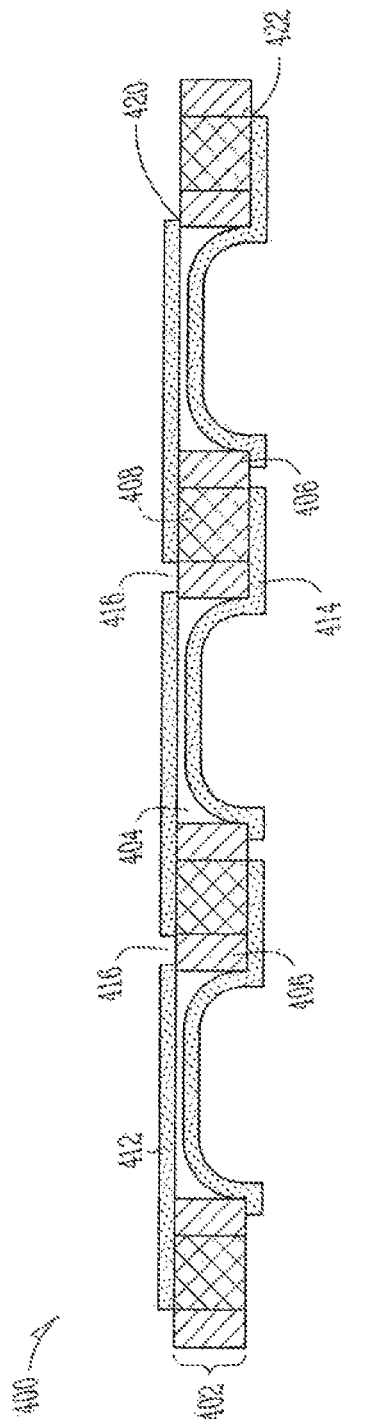
FIG. 4 illustrates an asymmetric fuel cell array.

In some embodiments of the invention, the inventive methods may be applied to produce fuel cells that are not symmetric. FIG. 4 illustrates such an embodiment that includes coated composite layer 400. Coated composite layer 400 includes composite layer 402, first coating 412, and second coating 414. First coating 412 is disposed over and adjacent to first side 420, while second coating 414 is disposed over and adjacent to second side 422. Material has been selectively removed from coatings 412 and 414 to leave three separate and distinct regions of material from each of first and second coatings 412, 414. Composite layer 402 includes a plurality of dielectric components 406, electron conducting components 408, and ion conducting components 404. Composite layer 402 is asymmetrically shaped, with ion conducting components 404 each having a concave depression directed towards second side 422.

Figure 5:
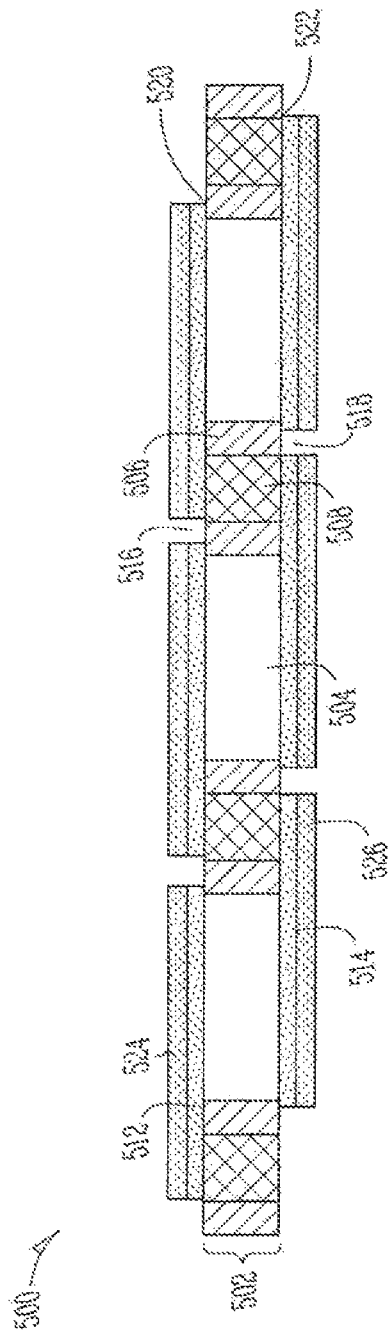
FIG. 5 illustrates a fuel cell array that includes a performance enhancing layer.

In some embodiments of the invention, the resulting fuel cell includes performance enhancing layers. Examples of such performance enhancing layers are described in commonly-assigned PCT International Published App. No. WO2011/079378, filed on 23 Dec. 2010 and entitled PERFORMANCE ENHANCING LAYERS FOR FUEL CELLS, the teachings of which are incorporated herein in their entirety. FIG. 5 illustrates a fuel cell, created using methods of the invention, that includes performance enhancing layers. Coated composite layer 500 includes composite layer 502, first coating 512, and second coating 514. Composite layer 502 includes a plurality of dielectric components 506, electron conducting components 508, and ion conducting components 504. First coating 512 is disposed over and adjacent to first side 520, while second coating 514 is disposed over and adjacent to second side 522. Performance enhancing layer 524 is disposed over first side 520 and over and adjacent to first coating 512, while performance enhancing layer 526 is disposed over second side 522 and over and adjacent to second coating 514. First coating 512 and performance enhancing layer 524 have been subjected to selective material removal using methods described herein and are divided into three separate and distinct regions by discontinuity regions 516. Second coating 514 and performance enhancing layer 526 have also been subjected to selective material removal using methods described herein and are divided into three separate and distinct regions by discontinuity regions 518. Also, while FIG. 5 illustrate the creation of discontinuity regions in a portion of two coating layers overlying dielectric components of a composite layer, the present invention is not so limited. For example, some embodiments of the present invention includes methods and articles where a discontinuity region is created in an area of two coating layers that overlie other portions of a composite layer (e.g., ion-conducting and/or electron-conducting components).

In some embodiments, the present invention includes methods of selectively removing coating material other than a catalyst or electrode layer. For example, a composite layer may be coated on one or both sides with a continuous conductive sheet, a continuous insulative sheet, a layer of material that aids with water management in an electrochemical cell, or some combination of layers thereof. The methods of selectively removing material with emitted energy, a stream of matter, or a mechanical tool described herein can be used to selectively remove portions of material from the continuous conductive or insulative sheets. Examples of continuous conductive sheets include carbon-fiber sheets impregnated or laminated with a non-porous material or plastic material sheets impregnated with one or more electrical conductive particles. Examples of materials that may aid with water management include porous polyethylene, expanded polyethylene, expanded Teflon™ material, and polyester mesh. The present invention may be used to form regions of discontinuity in a layer of these materials.

In some embodiments, the present invention includes methods of selectively removing material from such conductive or insulative sheets, while leaving behind material from a catalytic or electrode coating layer disposed on the composite layer.

The methods of this invention may be used to produce discontinuity regions have any desired width. Generally, the smallest feasible width is preferred to allow for the largest possible active area of the resulting electrochemical cell array. However, the width must also be sufficient to ensure electrical discontinuity between neighboring electrode regions of a coating layer. In one example, a discontinuity region has a preferred width of between about 75 and about 115 micrometers.

Figure 6:
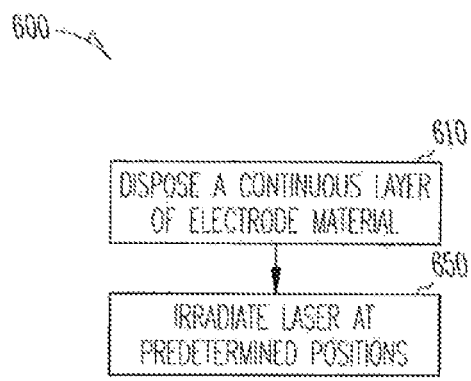
FIG. 6 illustrates a block flow diagram of one possible method to form regions of discontinuity in a layer of electrode material.

FIG. 6 illustrates a block flow diagram of one possible method to form regions of discontinuity in a layer of electrode material. In method 600, a coating layer (e.g., a layer of electrode or catalytic material or both) is disposed at stage 610. The coating layer is subjected to laser light irradiation at stage 650 to selectively remove coating layer material. In some embodiments, the layer of electrode material is aligned with the laser light tool so that the light is guided to the correct location for the selective removal during stage 650. For example, an imaging analysis program may be used to automatically and dynamically align the tool (e.g., a laser) with the coated composite layer being processed.

Figure 7:
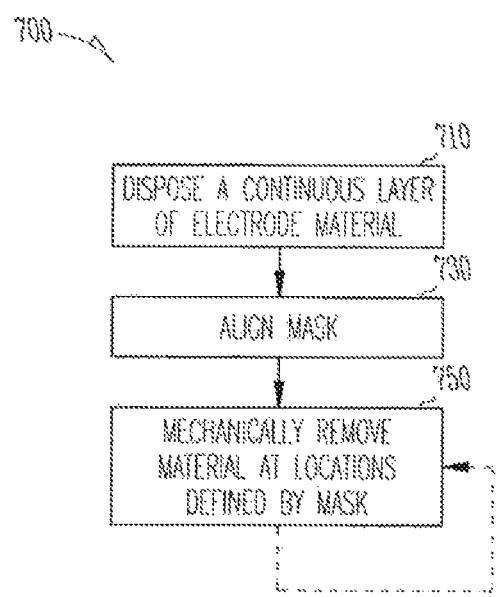
FIG. 7 illustrates a block flow diagram of one possible method to form regions of discontinuity in a layer of electrode material.

FIG. 7 illustrates a block flow diagram of another possible method to form regions of discontinuity in a layer of electrode material. In method 700, a coating layer (e.g., a layer of electrode or catalytic material or both) is disposed at stage 710. A mask is aligned at stage 730. One or more mechanical tools selectively remove material from the coating layer at stage 750. Stage 750 may be repeated.

In some embodiments, the invention includes methods of forming regions of discontinuity in a layer of electrode material that includes the use of computer numerical control (CNC) machines to control the tool used to remove the coating material. For example, a removal tool controlled by a CNC machine may remove coating material from a coated composite layer. The CNC machine may control the removal tool precisely enough that it eliminates the need for protective masks to be aligned with the composite layer.

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A method of manufacturing a fuel cell array, the method comprising:
    providing a composite layer and a first coating, wherein the composite layer includes a first surface and a second surface and the first coating is disposed over at least a portion of the first surface;

aligning a mask having an opening with the first coating or the composite layer; and guiding a mechanical tool by the opening in the mask to selectively remove portions of the first coating with the mechanical tool to form discontinuity regions at predetermined positions in the first coating.

2. The method of claim 1, wherein the composite layer includes a plurality of discrete dielectric components and a plurality of discrete electron conducting components extending from the first surface to the second surface.

3. The method of claim 2, wherein one or more of the plurality of discrete dielectric components extend from the first surface to the second surface.

4. The method of claim 2, wherein the plurality of dielectric components include at least one ion-conducting component.

5. The method of claim 1, wherein one or more of the discontinuity regions overlie a dielectric component.

6. The method of claim 1, wherein a second coating is disposed over at least a portion of the second surface and the method includes selectively removing portions of the second coating to form discontinuity regions at predetermined positions in the second coating.

7. The method of claim 6, wherein the discontinuity regions in the first coating are offset relative to the discontinuity regions in the second coating.

8. The method of claim 6, wherein a third coating is disposed between at least a portion of the first coating and the first surface and wherein the method further includes selectively removing portions of the third coating to form discontinuity regions in the third coating.

9. The method of claim 1, wherein a second coating is adjacent to the second surface.

10. The method of claim 1, wherein a form of energy is used to selectively remove portions of the first coating.

11. The method of claim 1, wherein a stream of matter is used to selectively remove portions from the first coating.

12. The method of claim 1, further including aligning a material-removal implement with the first coating or the composite layer before selectively removing portions of the first coating.

13. The method of claim 12, wherein selectively removing portions of the first coating includes using at least two tools in a defined sequence.

14. The method of claim 1, wherein selectively removing portions of the first coating forms an array of discrete electrodes on the composite layer.

15. The method of claim 14, wherein discontinuity regions have a width sufficient to provide an insular break between adjacent electrodes.

16. The method of claim 1, wherein the first coating is adjacent to the first surface.

17. The method of claim 1, wherein one or more of the discontinuity regions extend to the first surface.

18. The method of claim 1, further including aligning a mechanical tool with the mask before selectively removing portions of the first coating with the mechanical tool.

19. The method of claim 18, in which the mechanical tool removes material by a cutting, scribing, scoring, shaving, scraping, shearing, or cleaving process.

* * * * *